(12) United States Patent
Hatfield et al.

(10) Patent No.: US 12,181,919 B2
(45) Date of Patent: Dec. 31, 2024

(54) HEAD-MOUNTED DISPLAY AND FACIAL INTERFACE THEREOF

(71) Applicant: APPLE INC., Cupertino, CA (US)

(72) Inventors: Dustin A. Hatfield, Los Gatos, CA (US); Daniel M. Strongwater, San Francisco, CA (US); Kristi E. Bauerly, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/214,576

(22) Filed: Jun. 27, 2023

(65) Prior Publication Data

US 2023/0333595 A1 Oct. 19, 2023

Related U.S. Application Data

(63) Continuation of application No. 16/742,029, filed on Jan. 14, 2020, now Pat. No. 11,762,421.

(60) Provisional application No. 62/793,479, filed on Jan. 17, 2019.

(51) Int. Cl.
*G06F 1/16* (2006.01)
*G02B 27/01* (2006.01)

(52) U.S. Cl.
CPC ............ *G06F 1/163* (2013.01); *G06F 1/1637* (2013.01); *G02B 2027/0152* (2013.01); *G02B 27/0176* (2013.01)

(58) Field of Classification Search
CPC .................................................... G06F 1/1637
See application file for complete search history.

(56) References Cited

U.S. PATENT DOCUMENTS

| 5,822,127 A | 10/1998 | Chen et al. |
| 5,844,530 A | 12/1998 | Tosaki |
| 5,954,642 A | 9/1999 | Johnson et al. |
| 6,421,031 B1 | 7/2002 | Ronzani et al. |
| 6,520,182 B1 | 2/2003 | Gunaratnam |

(Continued)

FOREIGN PATENT DOCUMENTS

| CN | 103430534 A | 12/2013 |
| CN | 108152969 A | 6/2018 |

(Continued)

OTHER PUBLICATIONS fixit.com, "HTC Vive Teardown", Published Apr. 26, 2016, Downloaded Jul. 15, 2017, https://www.ifixit.com/Teardown/HTC+Vive+Teardown/62213#s130812, 22 pp.

(Continued)

*Primary Examiner* — William Boddie
*Assistant Examiner* — Bipin Gyawali
(74) *Attorney, Agent, or Firm* — Young Basile Hanlon & MacFarlane, P.C.

(57) ABSTRACT

A head-mounted display includes a display unit and a facial interface. The display unit includes a display for displaying graphical content to a user. The facial interface is coupled to the display unit and configured to engage a face of the user to support the display unit thereon. The facial interface includes an upper portion that engages a forehead of the user and side portions that engage temple regions of the user. The facial interface converts forward force applied to the upper portion by the forehead into inward force applied by side portions to the temple regions.

20 Claims, 11 Drawing Sheets

(56) References Cited

U.S. PATENT DOCUMENTS

| | | | |
|---|---|---|---|
| 6,596,161 B2 | 7/2003 | Kerfoot | |
| 6,931,668 B2 | 8/2005 | Dobbie et al. | |
| 7,216,647 B2 | 5/2007 | Lang et al. | |
| 8,482,488 B2 | 7/2013 | Jannard | |
| 8,576,276 B2 | 11/2013 | Bar-Zeev et al. | |
| 8,605,008 B1 | 12/2013 | Prest et al. | |
| 8,661,662 B1 | 3/2014 | Cok | |
| 8,814,691 B2 | 8/2014 | Haddick et al. | |
| 9,274,340 B2 | 3/2016 | Lyons | |
| 9,836,663 B2 | 12/2017 | Yun et al. | |
| 9,851,267 B1 | 12/2017 | Ma et al. | |
| 10,045,449 B1 | 8/2018 | Yee | |
| 10,496,130 B1 | 12/2019 | Yee | |
| 10,499,044 B1 | 12/2019 | Giokaris et al. | |
| 10,739,600 B1 | 8/2020 | Yee | |
| 10,761,567 B2* | 9/2020 | Ellis | A45F 5/00 |
| 2001/0027121 A1* | 10/2001 | Boesen | G06F 1/1647 |
| | | | 455/556.2 |
| 2004/0061663 A1 | 4/2004 | Reynolds et al. | |
| 2009/0243964 A1* | 10/2009 | Rottenkolber | G02C 11/10 |
| | | | 345/8 |
| 2012/0075169 A1 | 3/2012 | Iba et al. | |
| 2014/0098009 A1 | 4/2014 | Prest et al. | |
| 2014/0157496 A1* | 6/2014 | Ginther | A61F 9/029 |
| | | | 2/439 |
| 2014/0159995 A1 | 6/2014 | Adams et al. | |
| 2015/0219901 A1 | 8/2015 | Morimoto | |
| 2016/0036151 A1 | 2/2016 | Tominaga et al. | |
| 2016/0048287 A1 | 2/2016 | Lee | |
| 2016/0077547 A1 | 3/2016 | Aimone et al. | |
| 2017/0205846 A1 | 7/2017 | Nagata et al. | |
| 2017/0261388 A1 | 9/2017 | Ma et al. | |
| 2017/0277254 A1 | 9/2017 | Osman | |
| 2017/0311796 A1 | 11/2017 | Walsh et al. | |
| 2017/0361217 A1* | 12/2017 | Burdea | G16H 50/30 |
| 2017/0365101 A1 | 12/2017 | Samec et al. | |
| 2018/0046147 A1 | 2/2018 | Aghara et al. | |
| 2018/0217637 A1* | 8/2018 | Zou | G06T 19/006 |
| 2018/0218714 A1 | 8/2018 | Yamaguchi et al. | |
| 2019/0235255 A1 | 8/2019 | Seibert et al. | |
| 2019/0258442 A1 | 8/2019 | Hudman et al. | |
| 2022/0299763 A1 | 9/2022 | Kobayashi | |

FOREIGN PATENT DOCUMENTS

| | | |
|---|---|---|
| CN | 108345109 A | 7/2018 |
| CN | 108508611 A | 9/2018 |
| CN | 207908803 U | 9/2018 |
| EP | 3367159 A1 | 8/2018 |
| JP | H07084210 A | 3/1995 |
| JP | H11202796 A | 7/1999 |
| JP | 2006074798 A | 3/2006 |
| JP | 2017-130931 A | 7/2017 |
| JP | 6407793 B2 | 10/2018 |
| KR | 10-2018-0117327 A | 10/2018 |
| WO | 2013098378 A1 | 7/2013 |
| WO | 2014082023 A1 | 5/2014 |
| WO | 201519625 A1 | 2/2015 |
| WO | 2016061367 A1 | 4/2016 |

OTHER PUBLICATIONS fixit.com, "Razer OSVR HDK 2 Teardown", Published Aug. 10, 2016, Downloaded Jul. 15, 2017, https://www.fixit.com/Teardown/Razer+OSVR+HDK+2+Teardown/65804, 15 pp.

fixit.com, "PlayStation VR Teardown", Published Oct. 13, 2016, Downloaded Jul. 15, 2017, https://www.ifixit.com/Teardown/PlayStation+VR+Teardown/69341, 18 pp.

fixit.com, "Oculus Rift CV1 Teardown", Published Mar. 30, 2016, Downloaded Jul. 15, 2017, https://www.ifixit.com/Teardown/Oculus+Rift+CV1+Teardown/60612#s126787, 18 pp.

Invitation to Pay Additional Fees issued in copending International Application No. PCT/US2020/013439 dated May 13, 2020 (18 pp).

* cited by examiner

Determine condition of the head-mounted display (e.g., movement or content)
510

Operate lateral stability mechanism of facial engagement system according to condition
520

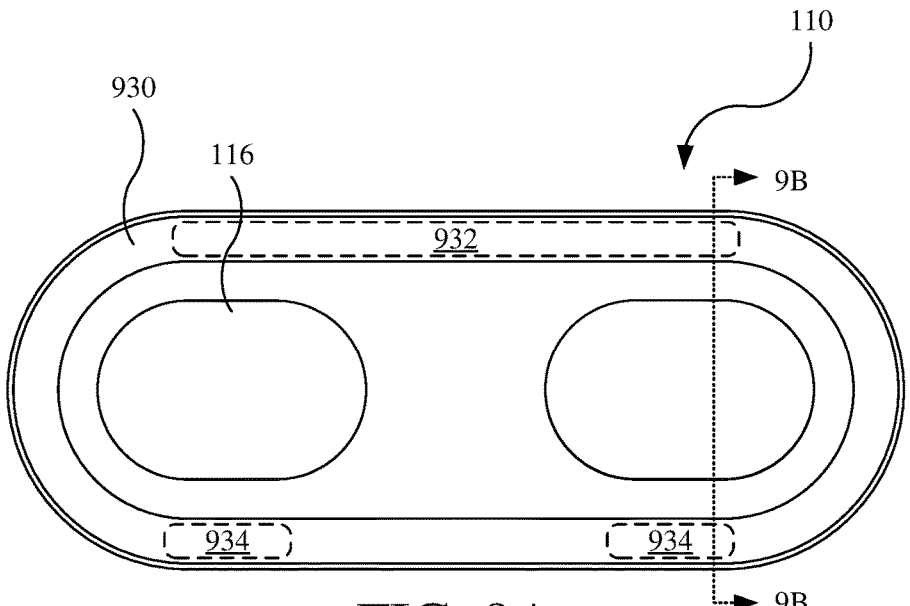
FIG. 9A
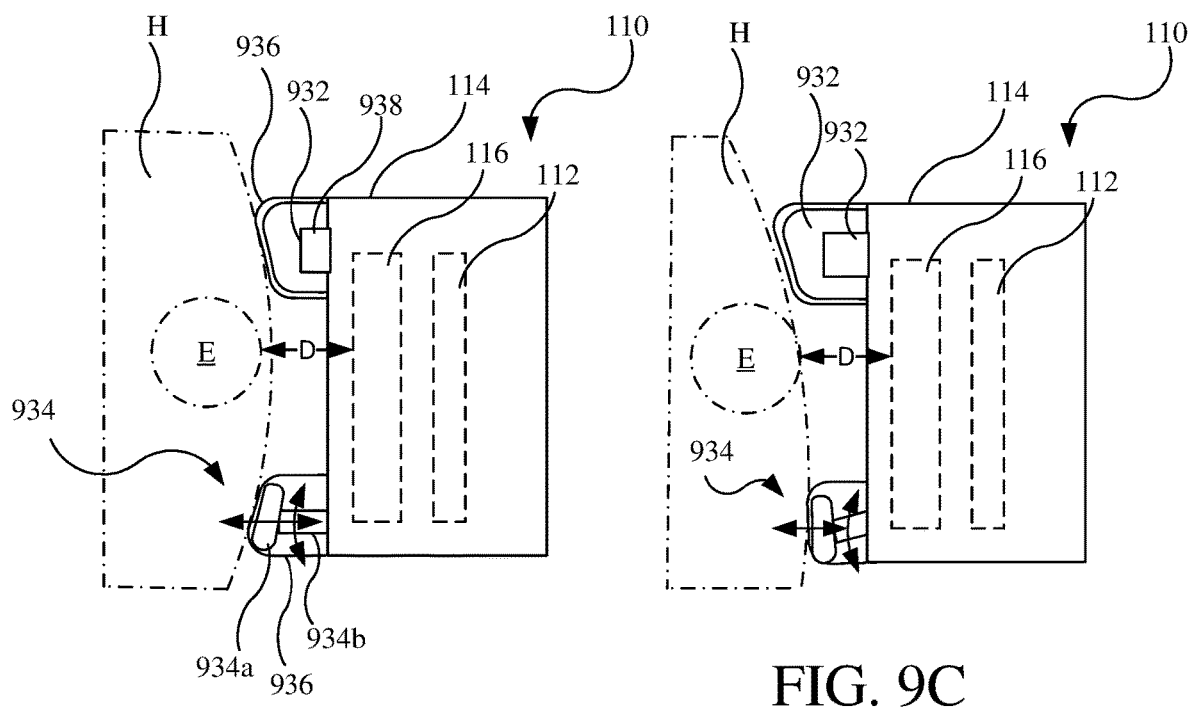
FIG. 9B
FIG. 9C

HEAD-MOUNTED DISPLAY AND FACIAL INTERFACE THEREOF

CROSS-REFERENCE TO RELATED APPLICATION(S)

This application is a continuation of U.S. application Ser. No. 16/742,029, filed on Jan. 14, 2020, which claims priority to and the benefit of U.S. Provisional Application No. 62/793,479, filed on Jan. 17, 2019. The content of the foregoing application is incorporated herein by reference in its entirety for all purposes.

TECHNICAL FIELD

This disclosure relates to display system and, in particular, head-mounted display units and facial interfaces thereof.

BACKGROUND

Head-mounted displays are display systems that are wearable on a head of a user. A head-mounted display generally includes a display, a head support, and a facial interface. The display includes display screens for displaying graphics. The head support is coupled to the display and engages the head of the user to support the display thereon. The facial interface is coupled to the display and engages the face of the user to support the display thereon. The facial interface may influence comfort of the user, especially when worn for long periods of time, and stability of the head-mounted display on the head of the user.

SUMMARY

Disclosed herein are implementations of head-mounted displays and facial interfaces thereof.

In one implementation, head-mounted display includes a display unit and a facial interface. The display unit includes a display for displaying graphical content to a user. The facial interface is coupled to the display unit and configured to engage a face of the user to support the display unit thereon. The facial interface includes an upper portion that engages a forehead of the user and side portions that engage temple regions of the user. The facial interface converts forward force applied to the upper portion by the forehead into inward force applied by side portions to the temple regions.

The facial interface may include a force distributor having an upper segment that forms the upper portion and two side segments that form the side portions, and forward movement of the upper segment causes inward movement of the side segments. The display unit and the facial interface may be cooperatively configured to block environmental light from eyes of the user. The facial interface may include a lateral stabilizer that selectively transfers force between one of the side portions and the display unit.

In one implementation, a head-mounted display includes a display unit and a facial interface. The display unit includes a display for displaying graphical content to a user. The facial interface is coupled to the display unit and configured to engage a face of the user to support the display unit thereon. The facial interface includes side portions and lateral stabilizers. The side portions engage opposing sides of the face of the user. The lateral stabilizers are selectively operated for changing inward force applied by the side portions to the sides of the face of the user.

The lateral stabilizers may be selectively operated upon sensing a movement condition of the display unit. The display unit and the facial interface are cooperatively configured block environmental light from eyes of the user.

In one implementation, a head-mounted display includes a display unit and a facial interface. The display unit includes a display for displaying graphical content to a user. The facial interface is coupled to the display unit and configured to engage a face of the user to support the display unit thereon. The facial interface includes an upper engagement structure and a lower engagement structure. The upper engagement structure is fixedly positioned relative to the display unit to prevent movement therebetween when engaging a forehead of the face of the user. The lower engagement structure is movably positioned relative to the display unit to allow movement therebetween when engaging a lower facial structure of the face of the user.

BRIEF DESCRIPTION OF THE DRAWINGS

In the drawings, dash-dash lines generally represent hidden components or components shown in different states. Dash-dot lines generally represent the user.

FIG. 9A is a rear view of the head-mounted display with another embodiment of a facial interface.

FIG. 9B is a cross-section view of the head-mounted display of FIG. 9A taken along line 9B-9B in a first configuration.

FIG. 9C is a cross-section view of the head-mounted display of FIG. 9A taken along line 9C-9C in a second configuration.

DETAILED DESCRIPTION

Disclosed herein are head-mounted displays and facial interfaces therefor. The facial interfaces disclosed herein are configured in different manners to provide user comfort and/or stabilize the head-mounted display on the face of the user. The facial interfaces may additionally be configured block ambient light from eyes of the user.

Figure 1A:
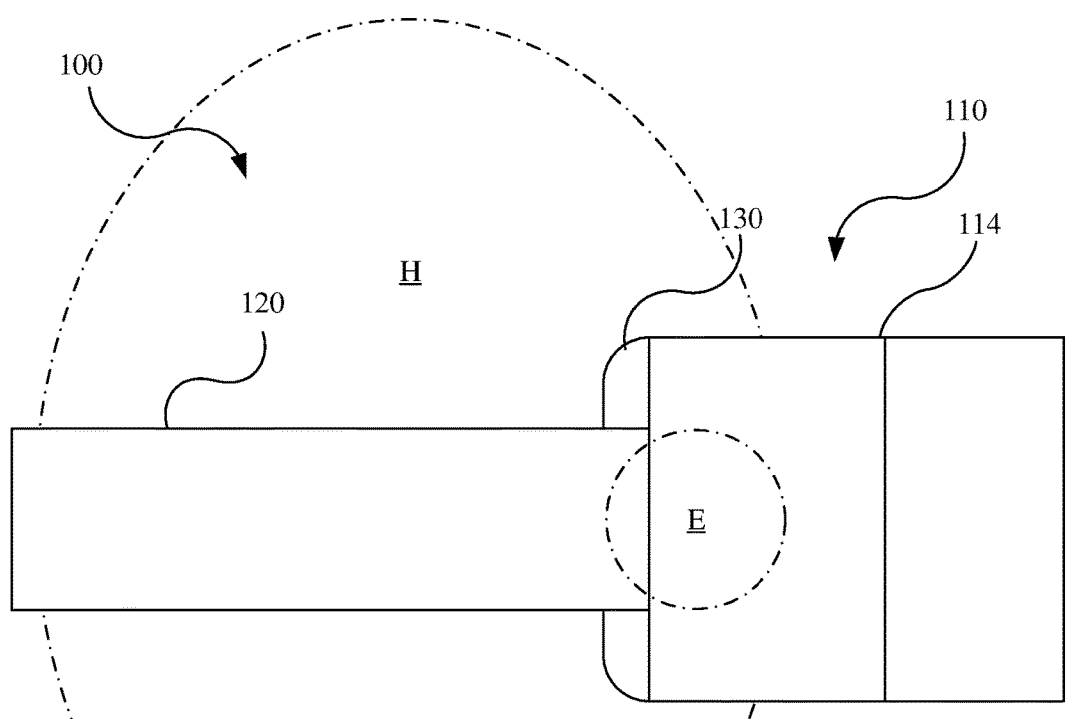
FIG. 1A is a side view of a head-mounted display worn on a head of a user.
Figure 1B:
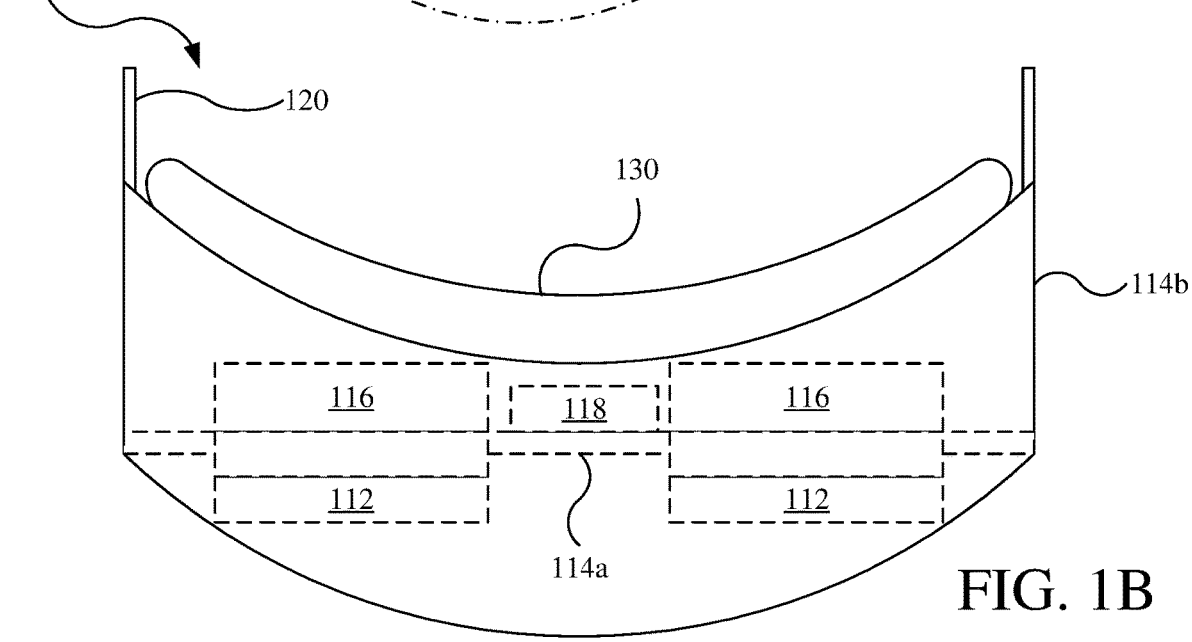
FIG. 1B is a partial top view of the head-mounted display of FIG. 1A.

Referring to FIGS. 1A and 1B, a head-mounted display 100 (HMD) is configured to be worn on a head H of a user and to display graphical content thereto, such as graphical content of a computer-generated reality environment (discussed in further detail below). The head-mounted display 100 generally includes a display unit 110, a head support 120, and a facial interface 130. The display unit 110 displays the graphical content to the user. The head support is coupled to the display unit 110 and engages a head H of the user for supporting the display unit 110 thereon. The head support 120 generally extends around and engages sides and a rear of the head H of the user. The facial interface 130 is coupled to the display unit 110 and engages a face of the user for supporting the display unit 110 thereon, being arranged between the face of the user and the display unit 110. The face of the user is generally considered a forward portion of the head H that includes at least the brow, eyes, nose, and cheeks of the user.

The display unit 110 generally includes one or more displays 112 and a chassis 114. As shown, the display unit 110 includes two displays 112 that are coupled to and supported by the chassis 114 (i.e., one of the displays 112 for each eye), or may instead include one display 112. The display 112 includes, for example, a display panel of suitable type (e.g., a liquid crystal display (LCD), organic light-emitting diode display (OLED), or a micro-OLED display). Other configurations of the display 112 and the chassis 114 are contemplated, such as including one display that is removably coupleable to the chassis 114, for example, being a smartphone.

The chassis 114 forms a primary structure that supports the displays 112 in proper position relative to eyes E of the user. The chassis 114 may, for example, include an internal frame 114a and an outer housing 114b. The internal frame 114a is coupled to and supports the displays 112. The outer housing 114b, for example, forms a housing (e.g., a cover) that may hide the internal frame 114a and the displays 112 from view of non-users (i.e., persons not currently wearing the head-mounted display 100). The chassis 114 (e.g., the outer housing 114b) may also function to block ambient light (e.g., from the environment) from reaching the eyes E of the user. The chassis 114 may also be referred to as a base or a housing.

The display unit 110 may also include lenses 116, or other optical components, and other electronic components 118. The one or more lenses 116, which are coupled to the chassis 114 and are arranged between each of the displays 112 and the eyes E of the user to refract light emitted from the displays 112 to the eyes E of the user. The displays 112 may be viewed through the lenses 116 but may otherwise be generally hidden from view, as indicated by being illustrated in dashed lines in FIGS. 1B and 1C. For example, the displays 112 may be covered by the outer housing 114b and be hidden behind a curtain (not labeled in FIG. 1C) that surrounds the lenses 116. The other electronic components 118 are discussed below with reference to FIGS. 2 and 3.

The head support 120 is coupled to the display unit 110 to support the display unit 110 on the head H of the user. For example, the head support 120 may include one or more bands (e.g., straps) that are coupled to opposite sides (e.g., left and right sides) of the chassis 114 and extend around sides of the head H of the user. The head support 120 may further include one or more bands (e.g., straps) that extend over a top of the head H of the user (e.g., front-to-back and/or side-to-side). The head support 120 may be adjustable in size, so as to accommodate to different sizes and/or shapes of heads H of users, for example, including elastically and/or mechanically expanding bands or other structures.

The facial interface 130 is configured to be arranged generally between the chassis 114 of the display unit 110 and the face of the user when the head-mounted display 100 is worn by the user. The facial interface 130 engages the face of user to support the display unit 110 thereon. The facial interface 130, for example, supports the display unit 110 on the face of the user at suitable horizontal, vertical, and longitudinal distances and angles for displaying the graphical content to the user. The facial interface 130 may further be configured to block environmental light from the eyes E of the user, comfortably engage facial structures of the user, and/or stabilize or secure the head-mounted display 100 on the face of the user. The facial interface 130 may be formed by or otherwise considered part of the display unit 110 and/or the head support 120 as discussed in further detail below. The facial interface 130 may also be referred to as a facial engagement system, a facial engagement mechanism, or a light seal.

Figure 1C:
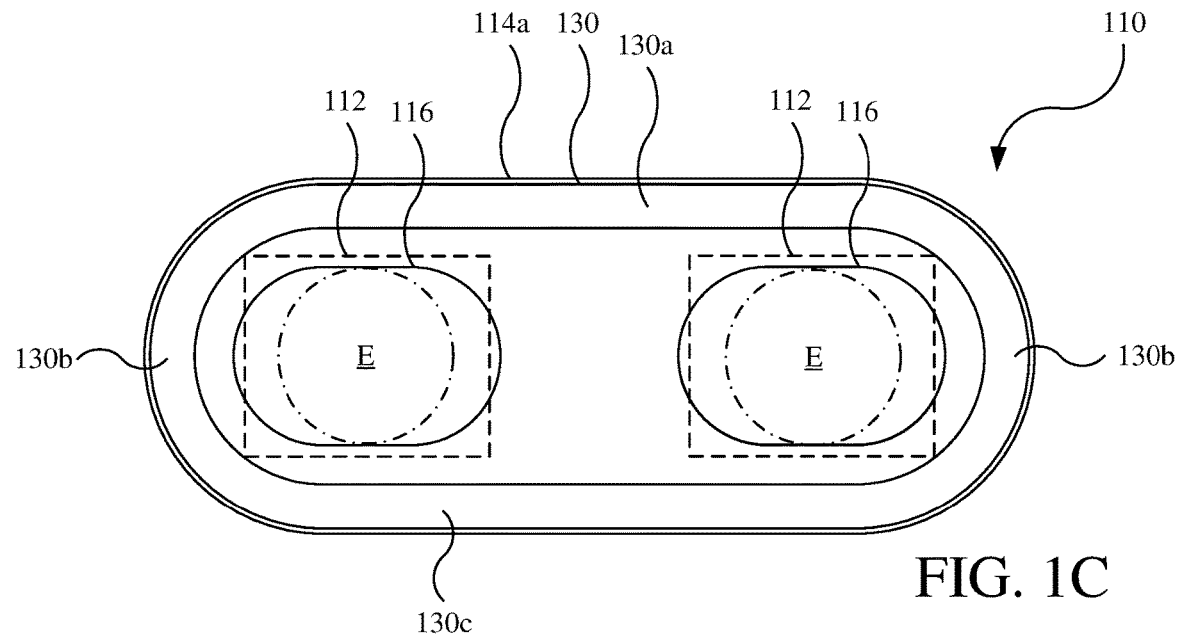
FIG. 1C is a rear view of the head-mounted display of FIG. 1A.

As shown in FIG. 1C, the facial interface 130 extends continuously around both eyes E of the user, so as to substantially continuously engage the face of the user therearound and block environmental light. The facial interface 130 may be considered to generally include an upper portion 130a, side portions 130b, and a lower portion 130c. The upper portion 130a of the facial interface 130 extends above the eyes E of the user and engages the forehead of the user. The side portions 130b of the facial interface 130 extend from the upper portion 130a downward around the eyes E of the user and engage opposing sides (e.g., temple regions) of the face of the user. The side portions 130b may also be referred to as flanges. The temple regions are generally considered those areas of the face or head extending rearward from the eyes E to ears of the user. The lower portion 130c of the facial interface 130 extends between the side portions 130*b* below the eyes E of the user and engage check regions of the face of the user and may further engage the nose of the user. In other embodiments, the 130 may extend partially around the eyes E of the user (e.g., being discontinuous at the nose of the user), extending only above the eyes E eye of the user (e.g., having only the upper portion 130*a*), or by omitting the side portions 130*b*, among other variations.

Figure 1D:
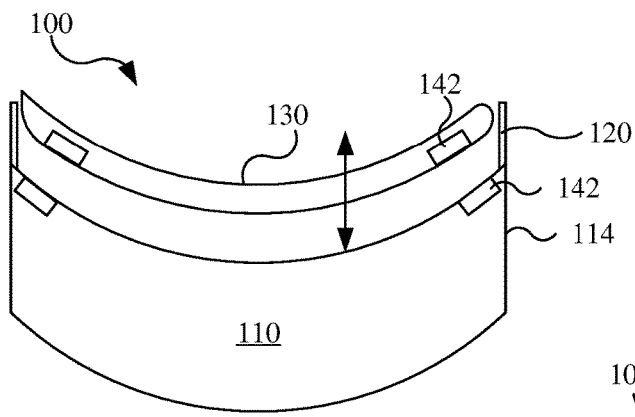
FIG. 1D is a top view of a variation of the head-mounted display of FIG. 1A with a facial interface detached from a display unit thereof.
Figure 1E:
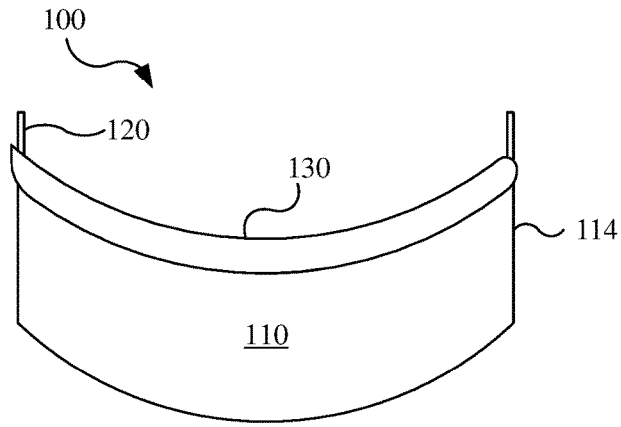
FIG. 1E is a top view of another variation of the head-mounted display unit of FIG. 1A with a head support coupled to a facial interface thereof.

As shown in FIG. 1D, the facial interface 130 may be removably coupleable to the display unit 110, for example, with mechanical fasteners 142, such as clips, magnets, or hook and loop fasteners. As shown in FIG. 1E, the head support 120, may couple to opposite sides of the facial interface 130 instead of or in addition to coupling to opposite sides of the chassis 114 of the display unit 110. For example, as shown, the head support 120 is coupled to the display unit 110 by way of the facial interface 130.

Various embodiments of the facial interface 130 are discussed in further detail below starting with reference to FIGS. 4A-4B.

Figure 2:
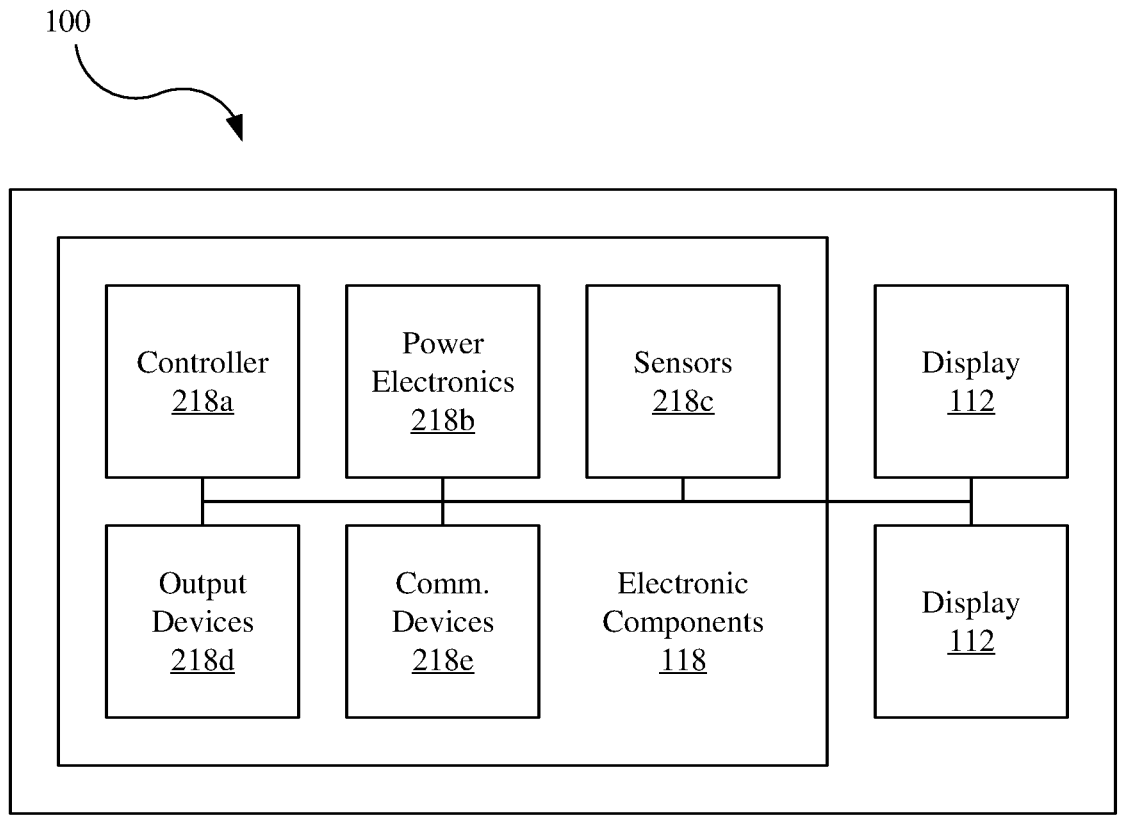
FIG. 2 is a schematic view of electronic components of the head-mounted display of FIG. 1A.
Figure 3:
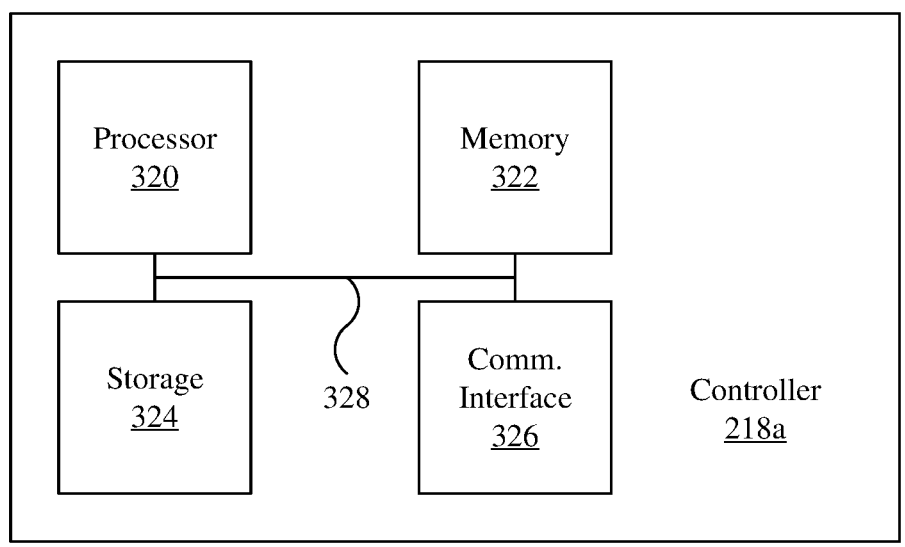
FIG. 3 is a schematic view of an example hardware configuration of a controller of FIG. 2.

Referring to FIG. 2, a schematic of example electronic components of the display unit 110 is shown, including the displays 112 and the other electronic components 118. The other electronic components 118 of the display unit 110 may include a controller 218*a*, power electronics 218*b*, sensors 218*c*, output devices 218*d*, and communication devices 218*e*. The controller 218*a* operates the head-mounted display 100 by executing instructions (e.g. software programming), receiving signals from various electronic components, and/or sending signals thereto. An example of a hardware schematic of the controller 218*a* is shown in FIG. 3 and described below with respect thereto. The power electronics 218*b* may, for example, include a power storage device (e.g., a battery), a power transfer device (e.g., plug, receptacle, or wireless charging coil), and/or a power conditioning device (e.g., to condition power in a suitable manner for powering the various electronics of the display unit 110). The sensors 218*c* may include sensors for measuring conditions of the head-mounted display 100 (e.g., position and/or motion (e.g., global positioning system (GPS), gyroscope, accelerometer, magnetometer, inertial measurement unit (IMU)), measuring conditions of the user (e.g., force, pressure, facial movements, eye movements, temperature, sounds, and various biometrics (e.g., heart rate, blood pressure, electroencephalogram (EEG), electrocardiogram (ECG)), and conditions of the environment (e.g., sound, light, temperature, barometric pressure, humidity). The output devices 218*d* may, for example, include audio output devices (e.g., speakers) and/or tactile output devices (e.g., haptic devices). The communication devices 218*e* may, for example, include wireless communication devices that are in communication with other devices via suitable wireless communications protocols (e.g., for Bluetooth, Wi-Fi, or cellular communication). The other devices may include other electronics devices associated with the user (e.g., a smartphone and/or a wearable device (e.g., a smartwatch).

The other electronic components 118 (depicted schematically in FIG. 1B) may also be coupled to the chassis 114 (e.g., the internal frame 114*a* as shown schematically) and may be hidden from view (e.g., being hidden by the outer housing 114*b*). Other ones of the other electronic components 118 may be coupled to the head support 120 and/or the facial interface 130.

Referring to the schematic view of FIG. 3, an example hardware configuration of the controller 218*a* is shown. The controller 218*a* is configured to implement the devices and methods described herein. The controller 218*a* may be any suitable computing device, which may include a processor 320, a memory 322, a storage 324, a communications interface 326, and/or a bus 328. The processor 320 may be any suitable processor, such as a central processing unit (CPU). The memory 322 is a suitable short-term storage device, such as a volatile memory module (e.g., random-access memory (RAM)). The storage 324 is a long-term storage device, such as a non-volatile memory storage device (e.g., a hard-disk drive (HDD) or solid-state drive (SSD)). The storage 324 may form a computer readable medium that stores software programming having instructions that are executed by the controller 218*a* for implementing the devices and methods described herein. The communications interface 326 is configured to send and/or receive signals from the controller 218*a*. The processor 320, the memory 322, the storage 324, and the communications interface 326 are in communication with each other via the bus 328. The processor 320 may execute software programming (e.g., code) stored by the storage 324, for example, to control outputs of the various electronic components (e.g., the displays 112, the output devices 218*d*) by sending signals thereto via the communications interface 326 and/or according to the various electronic components (e.g., the sensors 218*c*, the communication devices 218*e*) by receiving signals therefrom via the communications interface 326.

Referring to FIGS. 4A-9C, various embodiments of the facial interface 130 (e.g., 430, 530, 630, 730, 830, and 930) are discussed in further detail below. Common reference numerals may be used across different embodiments of the facial interface to reflect common elements. For example, various embodiments of the facial interface 130 may each include the upper portion 130*a*, the side portions 130*b*, and the lower portion 130*c*.

Figure 4A:
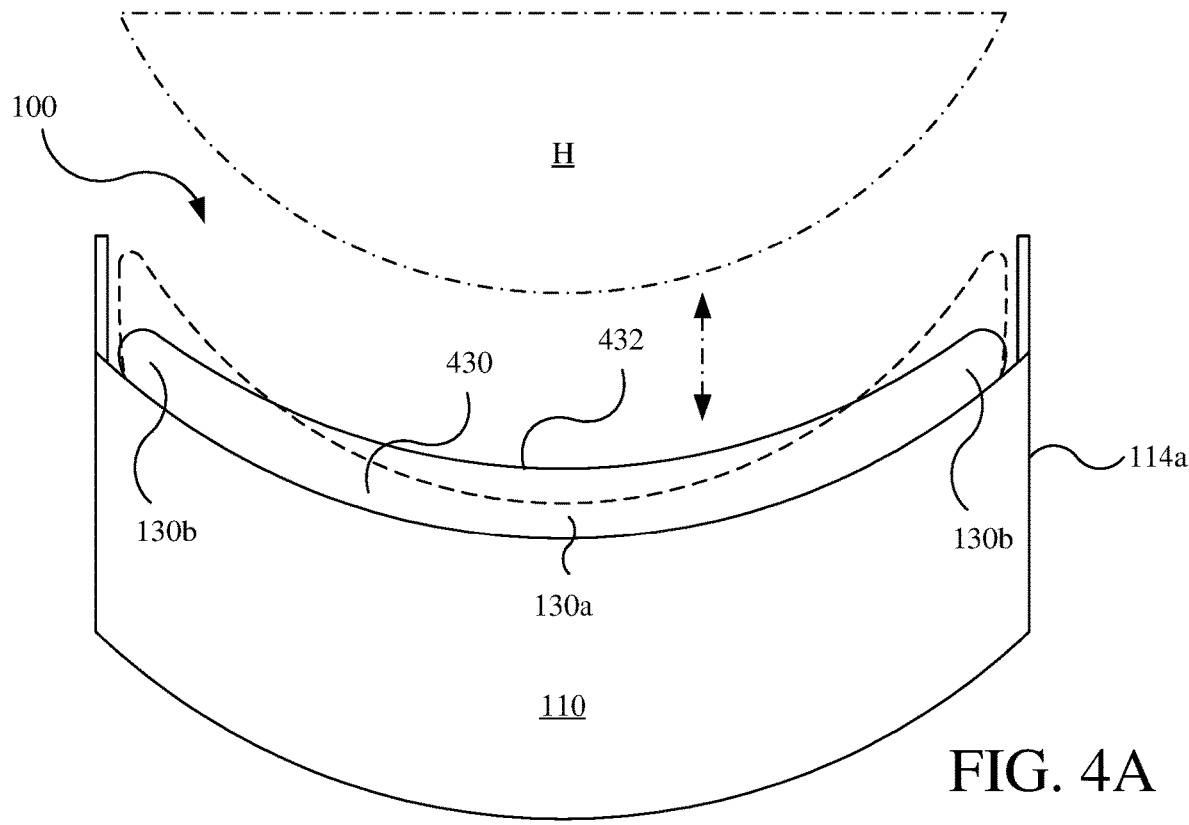
FIG. 4A is a top view of the head-mounted display of FIG. 1A illustrating an embodiment of a facial interface thereof in first state (solid lines) and a second state (dash-dash lines)
Figure 4B:
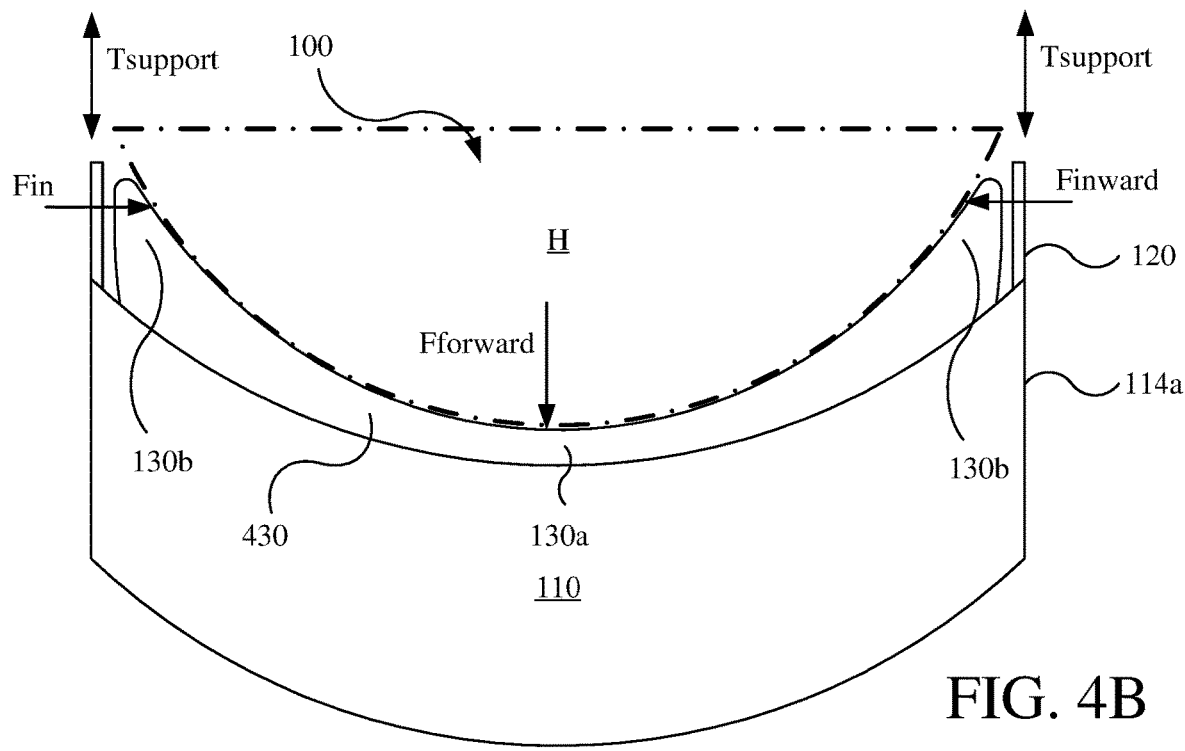
FIG. 4B is a top view of the head-mounted display of FIG. 4A with the head of the user engaging the facial interface in the second state.

As shown in FIGS. 4A-4B, a facial interface 430 is configured to convert forward force $F_{forward}$ applied thereto by the head H into inward force $F_{inward}$ applied therefrom to other portions of the head H, as well as convert forward movement of the facial interface 430 into inward movement for engagement with the head H. In this manner, the facial interface 430 is compliant to conform to the shape of the face of the user, changing from an unworn state (solid lines in FIG. 4A) to a worn state (dashed lines in FIG. 4A; solid lines in FIG. 4B).

The forward force $F_{forward}$ is applied between the forehead of the user and the upper portion 130*a* of facial interface 430. The forward force $F_{forward}$ may cause forward displacement thereof. The forward force $F_{forward}$, or a portion thereof, may also be applied between lower facial features of the user (e.g., cheeks and/or nose) and the lower portion 130*c* of facial interface 430, and may cause forward displacement thereof. The forward force $F_{forward}$ may, for example, be a result of tension $T_{support}$ in the head support 120 extending around the head H of the user.

The forward force $F_{forward}$ applied to the upper portion 130*a* and/or the lower portion 130*c* of the facial interface 430 causes the side portions 130*b* of the facial interface 430 to apply the inward force $F_{inward}$, or a portion thereof, to opposing sides of the face of the user (e.g., left and right temple regions). Similarly, the forward displacement of the upper portion 130*a* and/or the lower portion 130*c* of the facial interface 430 cause the side portions 130*b* to move inward into engagement with the side portions of the head H of the user. This contact (i.e., force transfer and engagement) between the facial interface 430 and the face of the user distributes force over the face of the user (e.g., for user comfort), stabilizes the head-mounted display 100 thereon, and may also block environmental light from the eyes E of the user.

The facial interface 430 may include an outer cover 432. The outer cover 432 engages the face of the user and may also cover underlying mechanisms (e.g., force distributors) that transfer force and movement in the manners described above, as well as block the environment light from the eyes E of the user. The outer cover 432 is formed of one or more materials (e.g., layers) that are compliant to the shape of the face of the user (e.g., being flexible and/or compressible) and otherwise being suitable for engagement with the face of the user. The outer cover 432 may include one or more layers of material, such a woven textile, a molded or extruded polymer, foam, or combination thereof.

The outer cover 432 may be configured with other components of the head-mounted display 100, such as the display unit 110, to block substantially all light from the eyes E of the user. For example, the outer cover 432 may be opaque and engage the face of the user in a substantially continuous manner to block environmental light from entering therebetween. The display unit 110 (e.g., the outer housing 114b thereof) may be opaque and prevent transmission of environmental light therethrough. Any components between the outer cover 432 and the display unit 110 may also be opaque to prevent light from transmitting therethrough. For example, the outer cover 432 may extend over any underlying mechanisms or force distributors (e.g., 534, 634, 734, among the other mechanisms disclosed herein) and couple to the display unit 110, or couple to an intermediate structure (e.g., a backing plate or structure of the facial interface 430) that is in turn coupled to the display unit 110.

Figure 5A:
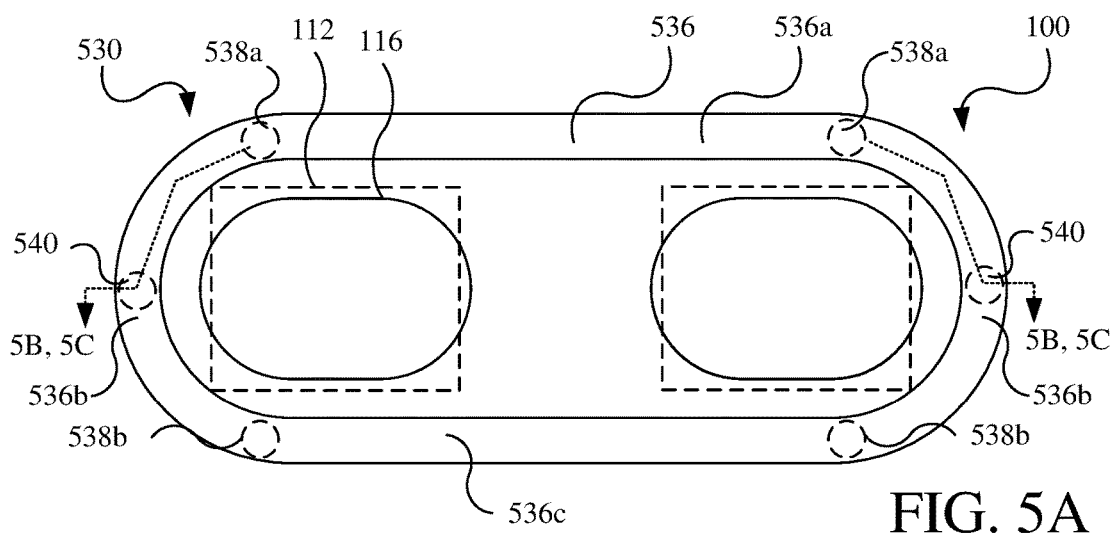
FIG. 5A is a rear view of the head-mounted display with an embodiment of a force distributor of the facial interface of FIG. 4A.
Figure 5B:
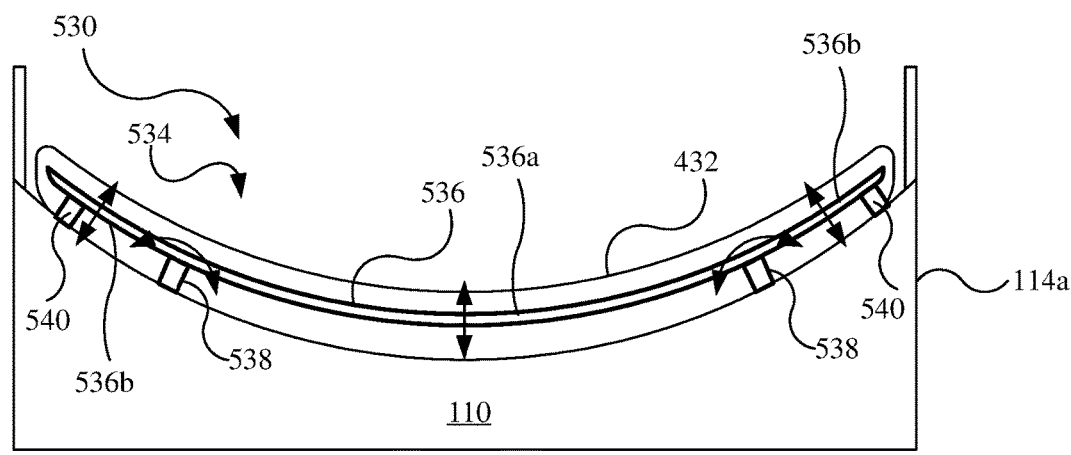
FIG. 5B is cross-sectional view of the head-mounted display taken along line 5B-5B in FIG. 5A in the first state.
Figure 5C:
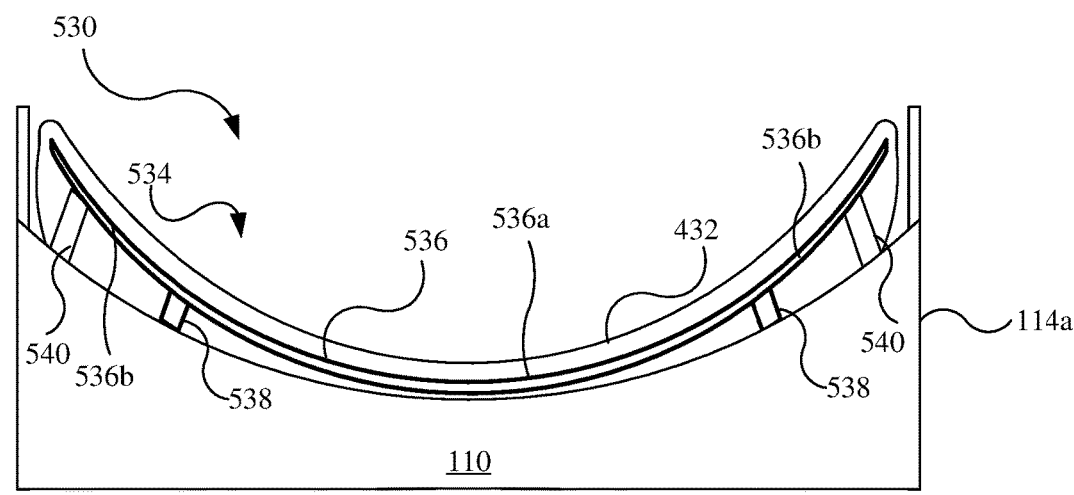
FIG. 5C is cross-sectional view of the head-mounted display taken along line 5C-5C in FIG. 5A in the second state.

Referring to FIGS. 5A-5C, a facial interface 530 includes an internal force distributor 534, which functions to transfer force and cause movement in the manners described above for the facial interface 430. The internal force distributor 534 of the facial interface 530 includes a peripheral structure 536 and supports 538. The peripheral structure 536 extends wholly (as shown) or partially around the eyes E of the user and distributes force over facial structures of the user (e.g., the forehead, temple regions, and cheeks). The supports 538 are coupled the peripheral structure 536 to the display unit 110 and form joints about which the internal force distributor 534 (e.g., the peripheral structure 536) is pivotable to convert the forward $F_{forward}$ into the inward force $F_{inward}$ and to convert the forward movement into the inward movement. The internal force distributor 534 may also be referred to as a force distributor.

As shown, the peripheral structure 536 generally includes an upper segment 536a (e.g., corresponding to and/or forming the upper portion 130a), two side segments 536b (e.g., corresponding to and/or forming the side portions 130b), and a lower segment 536c (e.g., corresponding to and/or forming the lower portion 130c). The supports 538 generally include two upper supports 538a and two lower supports 538b, which are spaced apart laterally. The upper segment 536a of the peripheral structure 536 extends generally between the upper supports 538a, the side segments 536b each extend generally between one of the upper supports 538a and one of the lower supports 538b, and the lower segment 538c extends generally between the lower supports 538b. As the forward force $F_{forward}$ is applied to the upper segment 536a and/or the lower segment 536c of the peripheral structure 536, torque is transferred about the upper supports 538a and/or the lower supports 538b to the side segments 536b to generate the inward force $F_{inward}$ that is applied by the side portions 130b of the facial interface 530 to the temple regions of the user. Forward displacement of the upper segment 536a and/or the lower segment 536c of the peripheral structure 536 similarly results in inward displacement of the side segments 536b for engagement of the side portions 130b of the facial interface 530 with the temple regions of the user.

The peripheral structure 536 may be a singular structure, which is configured to flex about the supports 538. For example, the peripheral structure 536 may be formed from metal, polymer, or combination thereof (e.g., elastomer or plastic overmolded or coupled to one or more thin metal components).

The supports 538 couple the peripheral structure 536 to the chassis 114 of the display unit 110, such that the peripheral structure 536 is spaced apart from the chassis 114 to be movable (e.g., pivotable) relative thereto. The supports 538 may include or form a pivot joint with the peripheral structure 536 and/or the chassis 114 of the display unit 110, such as a pivot hinge, a living hinge, a ball and socket joint, or other suitable pivoting mechanism. The supports 538 may couple directly to the chassis 114 of the display unit 110, or may be coupled indirectly thereto (e.g., via a chassis or back plate of the facial interface 530).

As referenced above, the facial interface 530 may provide lateral stability to the display unit 110 on the face of the user. Particularly, the to the inward force $F_{inward}$ applied by the side portions 130b of the facial interface 530 to the temple regions of the face of the user may prevent lateral movement of the display unit relative to the face of the user.

Still referring to FIGS. 5A-5C, the facial interface 530 may additionally include one or more lateral stabilizers 540 that further stabilize the head-mounted display 100 on the head H of the user. The lateral stabilizers 540 may increase the inward force $F_{inward}$ applied between the side portions 130b of the facial interface and the temple regions of the user and/or may restrict movement of the side portions 130b relative to the face of the user. The lateral stabilizers 540 may be configured according to position, nature of force transfer and type of mechanism, responsive conditions, and/or passive vs. active operation.

The lateral stabilizers 540 (depicted schematically) transfer force between the side segments 536b of the peripheral structure 536 and the display unit 110 directly or indirectly (e.g., via intervening structure, such as a backing plate of the facial interface 530). For example, the lateral stabilizers 540 may be arranged outward of the supports 538 and be coupled to the side segments 536b of the peripheral structure 536. Alternatively, the lateral stabilizer 540 may be provided with or otherwise incorporated into the supports 538 to controlling angular displacement between the side portion 130b and the display unit 110.

The lateral stabilizer 540 may operate to increase force applied by the side portion 130b to the temple region and/or may function to resist motion therebetween. In one example, the lateral stabilizer 540 moves the side portion 130b further toward the temple regions and into tighter engagement therewith (i.e., with greater force). In such case, the lateral stabilizer 540 may be a linear actuator, or other suitable positive displacement device. In another example, the lateral stabilizer 540 resists movement of the side portion 130b relative to the display unit 110 without causing positive displacement toward the user. In such case, the lateral stability actuator 540 may be a damper (e.g., a fluid damper that resists movement), a brake (e.g., a friction brake that resists movement), or a locking device that prevents movement. When configured as the brake or the locking device, the lateral stabilizer 540 may be actively operated (e.g., having a suitable electrically-operated actuator) or passively operated, for example, having a centrifugal clutch or weighted pendulum actuator.

The one or more lateral stabilizers 540 may operate responsive to motion of the display unit 110 or other condition. In one example, the lateral stabilizer 540 is responsive to movement of the display unit 110 (e.g., displacement, orientation, velocity, and/or acceleration) in real space and/or relative to the side portions 130b or the face of the user. In another example, the lateral stabilizer 540 may be responsive to another condition, such as the graphical content provided to the user (e.g., a signal corresponding thereto), such as graphical content associated with high levels of user movement (e.g., an action video game). By operating the lateral stabilizer 540 responsive to motion or other condition, a lower force may be applied to the face of the user to maintain user comfort in desired circumstances, while increased force may be conditionally applied to provide increased stability of the display unit 110 on the face of the user in other circumstances.

The lateral stabilizer 540 may be active or passive. When configured as an active lateral stabilizer, the motion or other condition of the display unit 110 is detected with one or more sensors or otherwise determined with the controller 218a, and the lateral stabilizer 540 is controlled in response to the sensed motion or other condition. With a passive lateral stabilizer, the output or state is a direct physical response of the motion or other condition without requiring electronic sensing or electronic control of the lateral stabilizer 540.

Figure 5D:
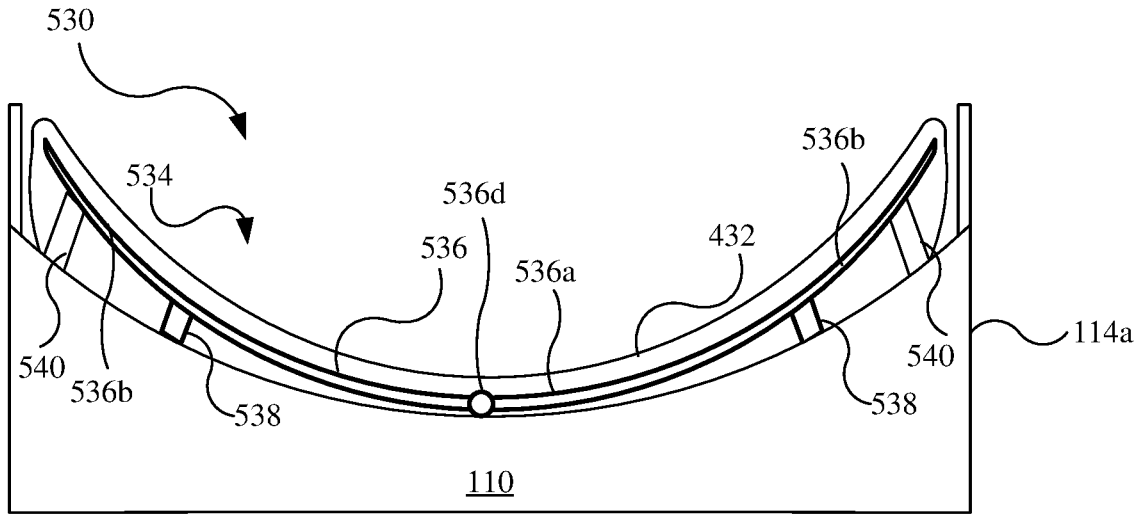
FIG. 5D is a cross-sectional view of the head-mounted display in the second state having a variation of a force distributor of FIG. 5A.

Referring additionally to FIG. 5D, movement and/or operation of the side portions 130b of the facial interface 130 may be linked between left and right sides of the head-mounted display 100. For example, displacement (e.g., outward to the left) of the side portion 130b on a left side of the head-mounted display 100 may result in symmetric movement (e.g., outward to the right) of the side portion 130b on a right side of the head-mounted display 100. In the example shown, the upper segment 536a of the peripheral structure 536 is bifurcated into left and right subsegments that are coupled to the side segments 536b (e.g., being continuously and/or rigidly formed therewith). The left and right subsegments of the upper segment 536a are coupled to each other by a central hinge 536d. As force is applied to one subsegment, the other, or both, the subsegments of the upper segment 536a pivot generally equally about the supports 538, thereby causing generally equal inward displacement of the side segments 536b. With similar effect, one or more of the lateral stabilizers 540 on left and right sides may operate symmetrically (e.g., outputting equal displacement and/or force to the side segments 536b on the left and right sides).

Figure 5E:
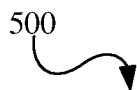
FIG. 5E is a flowchart of a method of operating the facial interface of FIG. 4A.

Referring to FIG. 5E, a method 500 is provided for actively controlling lateral stability of a head-mounted display 100 on the head H of a user. The method 500 generally includes a first operation 510 of detecting a condition of the head-mounted display 100, and a second operation 520 of operating a lateral stabilizer 540 in response to the first operation of detecting the condition.

The first operation 510 of detecting a condition is performed with one or more sensors, such as one of the sensors 218c, in conjunction with a computing device, such as the controller 218a. The sensor may sense acceleration of the display unit 110 in which case the sensor 218c is an accelerometer, gyroscope, or inertial measurement unit coupled to the display unit 110. The sensor 218c sends an output signal that is received by the controller 218a.

Instead of or in addition to acceleration, the sensor may detect movement between the display unit 110 and the side portion 130b and/or the face of the user movement (e.g., displacement, velocity, and/or acceleration). For example, the sensor 218c may be incorporated into the lateral stabilizer 540, the head support 120, or otherwise be configured to measure movement therebetween.

Instead of or in addition to the detecting acceleration of the display unit 110 or movement relative to the head of the user, the condition may be associated with the graphical content provided to the user. For example, the software programming associated with the graphical content (e.g., a game) may include instructions for operation of the lateral stabilizer 540, or the controller 218a may otherwise determine operation of the lateral stabilizer 540 based on the software programming (e.g., based on a title, category, or other indicator).

The second operation 520 of operating the lateral stabilizer 540 is performed by a controller, such as the controller 218a, based on the condition from the first operation 510. For example, the controller 218a may operate the lateral stabilizer 540 upon detecting a movement condition (e.g., that the movement in real space exceeds a threshold value, relative movement exceeds a threshold value), and/or upon detecting the condition associated with the graphical content. The lateral stabilizer 540 may be operated to, for example, change the position of the side portion 130b (e.g., further away from the display unit, such as with a linear actuator), increase the force at which the side portion 130b engages the face of user (e.g., with a linear actuator), and/or increase resistance to relative movement between the side portion 130b (e.g., with a damper, brake, or lock). The lateral stabilizer 540 on opposite sides (e.g., left and right sides) may be operated to provide generally symmetric output, for example, equal force, equal position, and/or equal resistance.

As was described with respect to FIGS. 1D and 1E, the facial interface 530 may be detachable from the display unit 110 and/or the head support 120 may be coupled thereto.

Figure 6A:
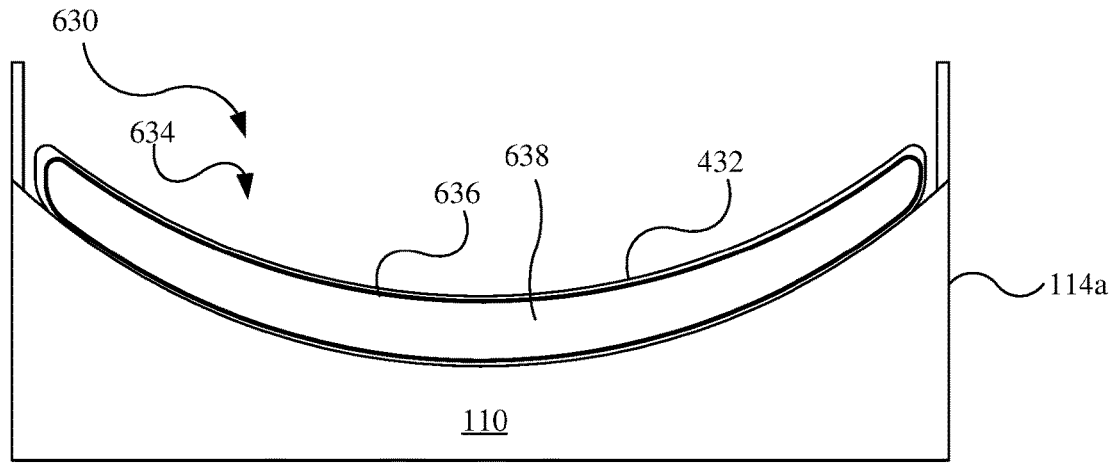
FIG. 6A is a cross-sectional view of the head-mounted display with another embodiment of a force distributor of the facial interface of FIG. 4A in the first state.
Figure 6B:
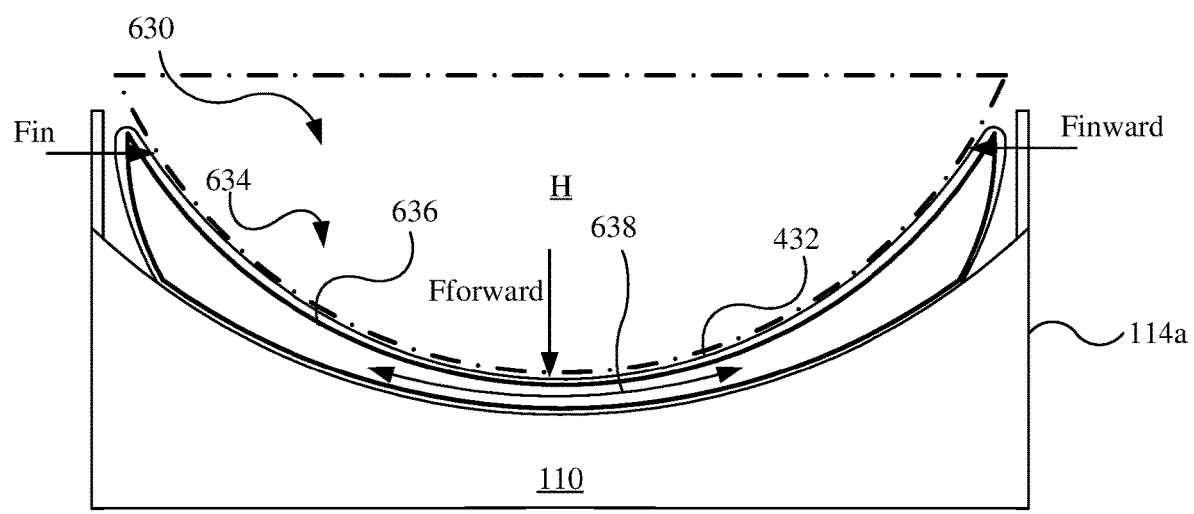
FIG. 6B is a cross-sectional view of the head-mounted display with a force distributor of FIG. 6A in the second state.

Referring to FIGS. 6A-6B, a facial interface 630 includes a fluid transfer device 634, which functions to transfer force and cause movement in the manners described above for the facial interface 430. The fluid transfer device 634 converts the forward force $F_{forward}$ and forward displacement of the upper portion 130a into the inward force $F_{inward}$ and inward displacement of the side portions 130b of the facial interface 630. The fluid transfer device 634 may be covered or formed by the outer cover 432.

The fluid transfer device 634 of the facial interface 630 includes a bladder 636 containing a fluid 638. As force is applied to the facial interface 630, the fluid 638 flows within the bladder 636 to equalize pressure therein. Thus, when the forward force $F_{forward}$ applied to the upper portion 130a of the facial interface 630 and causes forward displacement thereof, the fluid 638 flows through the bladder 636 to apply the inward force $F_{inward}$ with the side portions 130b and causes inward displacement (e.g., expansion) thereof against the temple regions of the user. The bladder 636 may, for example, be formed of an elastomeric material (e.g., rubber).

As was described with respect to FIGS. 1D and 1E, respectively, the facial interface 630 may also be detachable from the display unit 110 and/or the head support 120 may be coupled thereto.

Figure 7A:
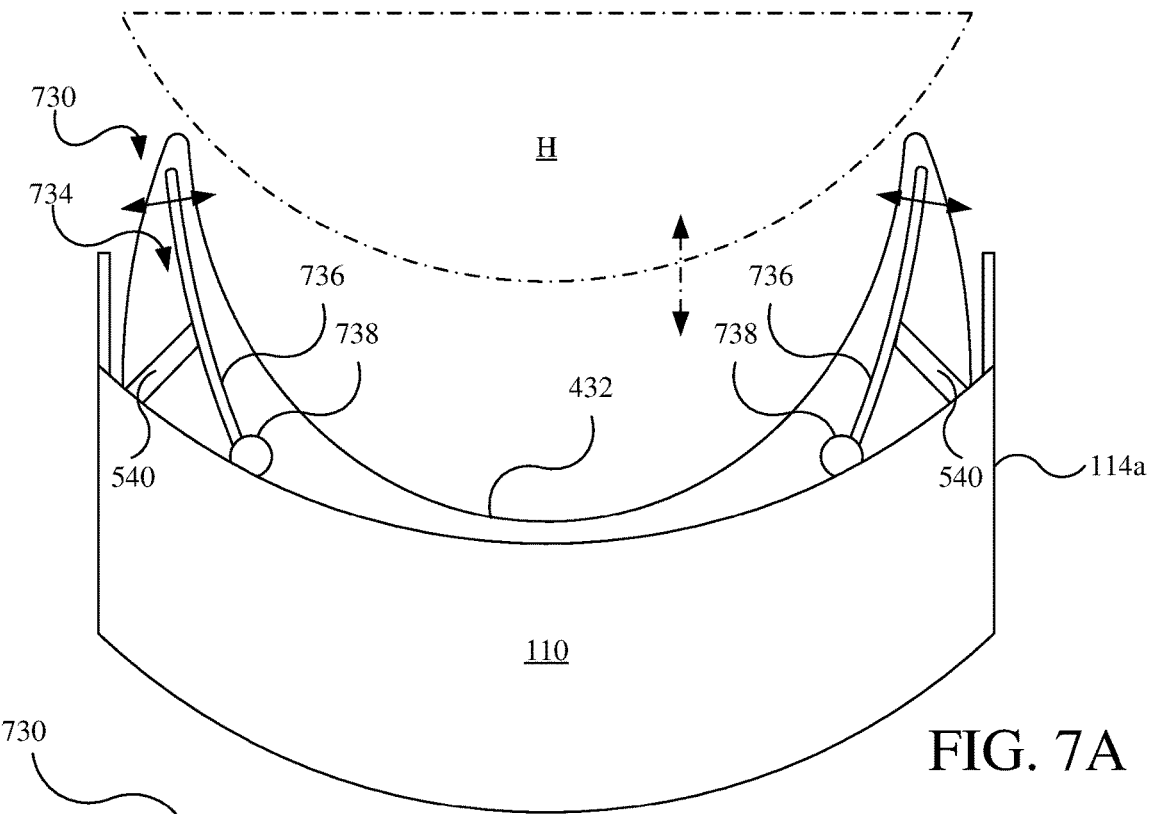
FIG. 7A is a cross-sectional view of the head-mounted display with another embodiment of a facial interface showing a force distributor in a first state.
Figure 7B:
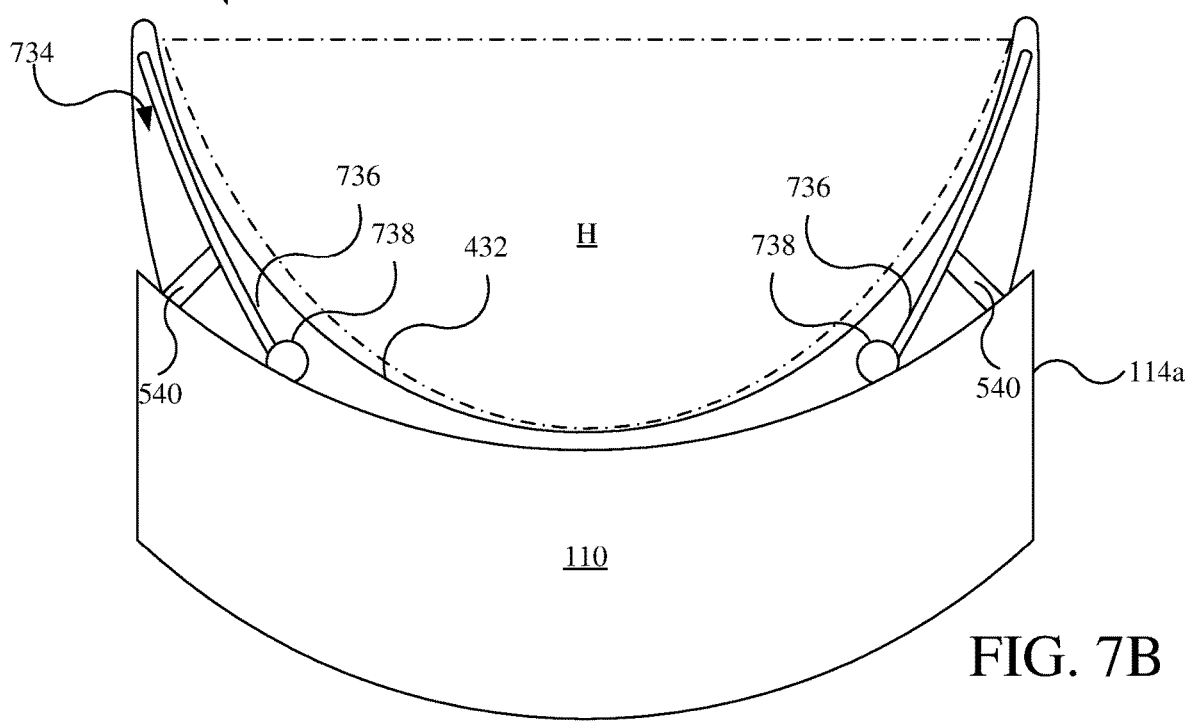
FIG. 7B is a cross-sectional view of the head-mounted display with the facial interface of FIG. 7A in a second state.

Referring to FIGS. 7A-7B, a facial interface 730 is configured to expand to receive the face of the user. The side portions 130b are normally biased inward, and bias outward when engaged by the face of the user. As shown, the facial interface 130 includes the outer cover 432 and an inner force distributor 734 having arms 736, which form the side portions 130b to be compliant to the face of the user. In a resting state or non-worn state (see FIG. 7A), the side portions 130b are spaced apart lateral distances less than the width of the face of the user at corresponding positions at which the side portions 130b engage the face of the user. In a biased or worn state (see FIG. 7B), the side portions 130b engage the face of the user and are spaced apart lateral distances generally equal to the width of the face of the user.

The arms 736 are biasable away from each other so as to conform to the shape of the face of the user. In one example, the arms 736 are coupled to the display unit 110 with spring hinges 738, which normally bias the arms 736 inward to the non-worn state and which press the arms 736 toward the face of the user in the worn state.

Alternatively, the arms 736 may bend elastically, so as to be movable between the non-worn and worn states. For example, the arms 736 may be rigidly coupled to the display unit 110 (directly or indirectly, such as with a backing plate of the facial interface 730). In such case, the arms 736 are formed of a sprung material, such as a polymer, metal, or combination thereof (e.g., elastomer or plastic overmolded or coupled to one or more thin metal components).

The facial interface 730 may also include one or more the lateral stabilizers 540 (described previously), which are coupled to the arms 736 for applying force thereto (e.g., transferring force from the arms 736 to the display unit 110). As shown in FIGS. 1D and 1E, respectively, the facial interface 730 may be detachable from the display unit 110 and the head support 120 may be coupled thereto.

Figure 8:
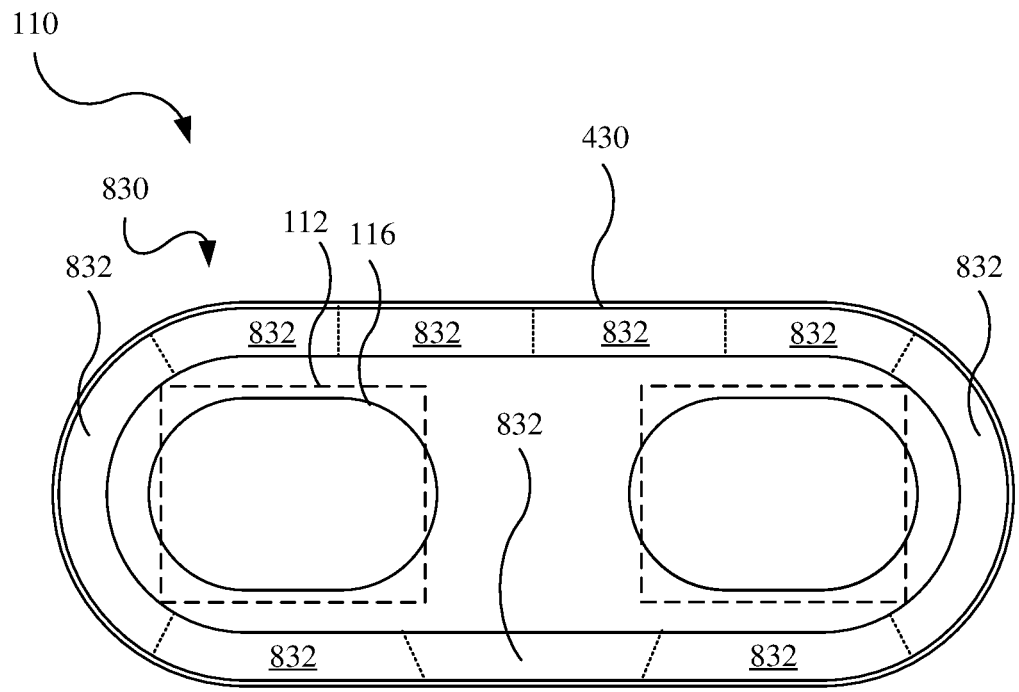
FIG. 8 is a rear view of the head-mounted display with another embodiment of a facial interface.
Figure 8A:
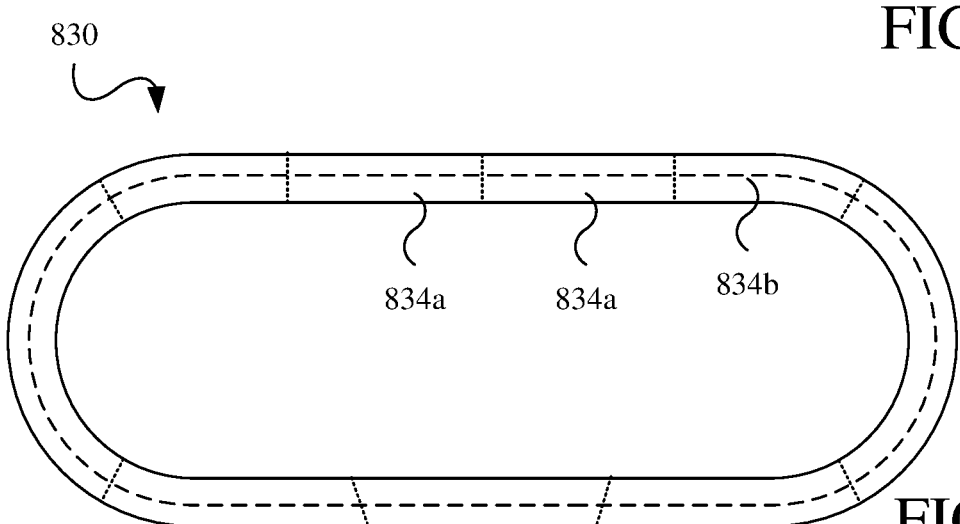
FIG. 8A is a rear view of the facial interface of FIG. 8A with a first example of a force distributor.
Figure 8B:
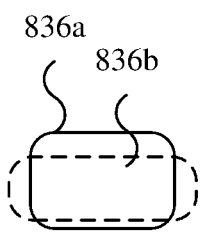
FIG. 8B is a top view of a second example of a force distributor for the facial interface of FIG. 8.
Figure 8C:
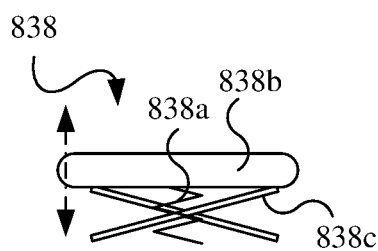
FIG. 8C is a top view of a third example of a force distributor for the facial interface of FIG. 8.
Figure 8D:
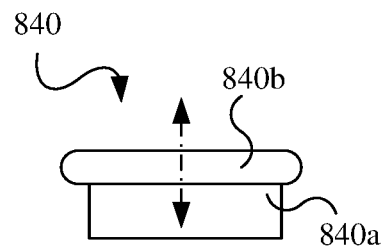
FIG. 8D is a top view of a fourth example of a force distributor for the facial interface of FIG. 8.
Figure 8E:
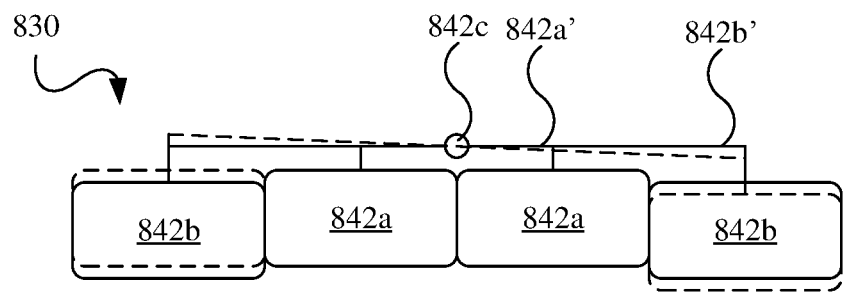
FIG. 8E is a top view of a fifth example of a force distributor for the facial interface of FIG. 8.

Referring to FIGS. 8-8E, a facial interface 830 includes discrete engagement regions 832 that are configured to apply different amounts of force or pressure to different facial regions of the face of the user. As shown, the discrete engagement regions 832 are illustrated between short dotted lines (e.g., dot-dot lines). By having different engagement regions that apply different amounts of force or pressure, the facial interface 130 may account for different sensitivities and/or structural features of the face of the user. For example, the facial interface 130 may be configured to engage bony structures of the user (e.g., the forehead) with greater force and/or pressure than soft tissue regions of the user (e.g., the temple, cheek, or sinus regions).

The different forces applied by the discrete engagement regions 832 are applied by different force distributors, which may be covered by the outer cover 432. In a first example shown in FIG. 8A, the force distributors are formed by elastomeric structures 834a (e.g., foam blocks or structures), which may have different durometers and/or thicknesses to apply different force and/or pressure to the face of the user. The elastomeric structures 834a may be coupled to each other (e.g., with an adhesive), cooperatively formed (e.g., during a molding operation), or mechanically interconnected, such as with a sprung ring 834b (as shown) extending therethrough.

In a second example, shown in FIG. 8B, the force distributors are fluid-filled bladders 836a, which apply different pressure based on having bladder materials with different elasticity and/or fluids 836b with different compressibility. As force is applied, the fluid-filled bladders 836a may deform in shape (illustrated in dashed lines). The fluid-filled bladders 836a may be coupled to each other directly (e.g., with an adhesive) or indirectly (e.g., via a backing plate, or via the outer cover 432).

In a third example, shown in FIG. 8C, the force distributors are linear spring mechanisms 838 having a spring 838a (e.g., a coil spring, or other elastic member) that presses a bearing structure 838b (e.g., a plate) that in turn applies force to the facial structure of the user. The linear spring mechanism 838 may further include one or more guide structures 838c that ensures proper alignment and/or orientation of the bearing structure 838b relative to the spring 838a. The guide structure 838c may, for example, be a scissor mechanism (as shown) or butterfly mechanism, such as those used in keyboards.

In a fourth example, shown in FIG. 8D, the force distributors are actuator mechanisms 840 having an actuator 840a (e.g., an electric motor) and a bearing structure 840b. The actuator 840a is controllable by a controller, such as the controller 218a, to control displacement and apply force with the bearing structure 840b in a desired manner, such as with a desired output force (i.e., independent force). The actuator 840a may be any suitable type of actuator, such linear actuator, linear motor, pneumatic actuator, or hydraulic actuator.

Referring additionally to FIG. 8E, operation of one or more of the force distributors may be linked to one or more of the other force distributors. For example, as shown in FIG. 8E, inner ones of the mechanical force distributors 842a may be coupled to each other with an inner pivoting linkage 842a', and outer ones of the mechanical force distributors 842b may be coupled to each other by an outer pivoting linkage 842b'. The pivoting linkages 842a', 842b' may be linkages that pivot about a central pivot axis 842c to cause substantially equal and opposite movement (e.g., forward and rearward) of the two mechanical force distributors 842 and substantially equal force application thereby to the user. For example, as illustrated in dashed lines in FIG. 8E, forward displacement of the outer mechanical force distributor 842b on the left side results in rearward displacement of the outer mechanical force distributor 842b on the right side.

Referring to FIGS. 9A-9C, the head-mounted display 100 includes a facial interface 930 by which the upper portion 130a sets a generally fixed eye relief distance D, which is the distance from eyes E of the user to optical components of the display unit 110, such as the lenses 116. Considering different shapes of facial structures, for example between different ages and/or ethnicities, different geometries of the facial interface 130 may be required to set the eye relief distance at an appropriate or optimized value across different users. As such, the upper portion 130a of the facial interface 130 may be configured to be adjustable or interchangeable with those of different sizes to properly establish the eye relief distance D for a given user and the head-mounted display 100. For example, different ones of the facial interfaces 930 may be configured with different sizes (e.g., different sizes of upper engagement structures 932 as discussed below) and be interchangeably coupleable to the display unit 110.

The facial interface 930 includes an upper engagement structure 932 and one or more lower engagement structures 934 (e.g., two as shown), which may be covered by one or more coverings 936.

The upper engagement structure 932 is configured to engage the forehead of the user to support the display unit 110 thereon and to reliably establish the eye relief distance D. When the facial interface 930 is coupled to the display unit 110, the upper engagement structure 932 is fixedly positioned to the display unit 110, so as to be generally immovable in the fore-aft, left-right, and up-down directions (e.g., under normal loading by the head H of the user, for example, when the upper engagement structure 932 is in the process of engaging the forehead). The upper engagement structure 932 may further be generally rigid (e.g., so as to not compress under normal loading from the head H of the user), while the covering 936 and/or an intermediate compressible layer therebetween, may conform to the shape of the user. Being generally rigid, the upper engagement structure 932 may reliably establish the eye relief distance D for a given user irrespective of some other conditions, such as tension in the head support 120.

The upper engagement structure 932 may be adjustable between stationary positions on the display unit 110, for example, being able to move inward and outward relative thereto to set the eye relief distance D for different users. For example, the facial interface 930 may include a distance adjustor 938 by which the upper engagement structure 932 is adjustable. The distance adjustor 938 may, for example, be a lead screw by which the facial interface 930 is movable between retracted and extended stationary positions (compare FIGS. 9B and 9C). When in each the stationary positions, the upper engagement structure 932 is fixedly positioned to the display unit 110. Instead of being adjustable, different sizes of the upper engagement structure 932 may be interchangeably coupleable to the facial interface 930 and/or the display unit 110, such as being part of interchangeable facial interfaces 930, as referenced above.

The lower engagement structures 934 are movably coupled to the display unit 110. Each of the lower engagement structures 934 may, for example, move in the vertical direction (e.g., pivot relative thereto), left-right direction (e.g., pivoting) and in the fore-aft direction, as indicated by arrows. In this manner, the lower engagement structures 934 may conform to the shape of the face of the user, for example, when in the process of engaging a lower facial structure thereof. The lower engagement structures 934 may, for example, include a bearing member 934a that applies force to the face of the user, and a moving member 934b by which the bearing member 934a is pivotably coupled to the display unit 110 (compare FIGS. 9B and 9C).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, including sensing movement for stabilizing a head-mounted display on a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data (e.g., movement thereof) can be used to stabilize the head-mounted display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of monitoring movement for stabilizing a head-mounted display, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, stabilization of the head-mounted display may be made by inferring preferences based on non-personal information data or a bare minimum amount of personal information, such as the content being requested by the device associated with a user, other non-personal information available, or publicly available information.

What is claimed is:

1. A head-mounted display comprising:
   a display unit having a display for displaying graphical content to a user; and
   a facial interface coupled to the display unit and configured to engage a face of the user to support the display unit thereon, the facial interface including:
     an upper portion configured to engage a forehead of the user,
     a first side portion configured to engage a first temple region of the user, wherein the first side portion includes a first arm that is coupled to the display unit by a first spring hinge at a first location and a first lateral stabilizer located outward relative to the first location that extends between the first arm and the display unit, and
     a second side portion configured to engage a second temple region of the user, wherein the second side portion includes a second arm that is coupled to the display unit by a second spring hinge at a second location and a second lateral stabilizer located outward relative to the second location that extends between the second arm and the display unit,
   wherein the facial interface is configured to expand to receive the face of the user by movement of the side portions with respect to the upper portion.

2. The head-mounted display of claim 1, wherein the first side portion and the second side portion of the facial interface are normally biased inward and are configured to move outward when engaged by the face of the user.

3. The head-mounted display of claim 1, wherein the facial interface has a resting state, in which the first side portion and the second side portion of the facial interface are spaced apart by a distance that is less than a width of the face of the user, and a worn state, in which the first side portion and the second side portion engage the face of the user and are spaced apart by a distance that is generally equal to the width of the face of the user.

4. The head-mounted display of claim 3, wherein the first side portion and the second side portion of the facial interface are biased toward each other by the first spring hinge of the first side portion and the second spring hinge of the second side portion.

5. The head-mounted display of claim 1, wherein the first arm of the first side is portion and the second arm of the second side portion are covered by an outer cover that is configured to engage the face of the user and to block substantially all environmental light from eyes of the user.

6. The head-mounted display of claim 1, wherein the lateral stabilizers extend between the arm of each respective one of the side portions and the display unit, and wherein the lateral stabilizers include locking devices that are configured to prevent movement of the arm of each respective one of the side portions relative to the display unit.

7. A head-mounted display comprising:
   a display unit having a display for displaying graphical content to a user; and
   a facial interface coupled to the display unit and configured to engage a face of the user for supporting the display unit thereon, wherein the facial interface includes:
     a first arm coupled to the display unit at a first location and forming a first side portion of the facial interface,
     a second arm coupled to the display unit at a second location and forming a second side portion of the facial interface,
     a first lateral stabilizer coupled to the first arm and the display unit, wherein the first lateral stabilizer is coupled to the first arm at a location along the first arm that is outward relative to the first location, and wherein the first lateral stabilizer is configured to resist movement of the first arm relative to the display unit, and
     a second lateral stabilizer coupled to the second arm and the display unit, wherein the first lateral stabilizer is coupled to the second arm at a location along the second arm that is outward relative to the second location, and wherein the second lateral stabilizer is configured to resist movement of the second arm relative to the display unit,
   wherein the first arm and the second arm are configured to conform to a shape of the face of the user.

8. The head-mounted display of claim 7, wherein the first arm and the second arm are configured to move away from each other to conform to the shape of the face of the user.

9. The head-mounted display of claim 8, wherein the first arm is pivotably coupled to the display unit, the second arm is pivotably coupled to the display unit, and the first arm and the second arm are configured to rotate away from each other and relative to the display unit to conform to the shape of the face of the user.

10. The head-mounted display of claim 9, wherein the first arm and the second arm are biased toward each other.

11. The head-mounted display of claim 7, wherein the first arm and the second arm are coupled to the display unit and are configured to bend elastically to conform to the shape of the face of the user.

12. The head-mounted display of claim 11, wherein the first arm and the second arm are formed of a sprung material.

13. The head-mounted display of claim 11, wherein the first arm and the second arm are rigidly coupled to the display unit.

14. A head-mounted display comprising:
a display unit having a display for displaying graphical content to a user; and
a facial interface coupled to the display unit and configured to engage a face of the user to support the display unit thereon, the facial interface including:
- a first arm coupled to the display unit at a first location, wherein the first arm is configured to pivot relative to the display unit and to conform to a shape of the face of the user,
- a second arm coupled to the display unit at a second location, wherein the second arm is configured to pivot relative to the display unit and to conform to the shape of the face of the user,
- a first lateral stabilizer located outward relative to the first location and extending between the first arm and the display unit, wherein the first lateral stabilizer is configured to transfer a first force between the first arm and the display unit, and
- a second lateral stabilizer located outward relative to the second location and extending between the second arm and the display unit, wherein the second lateral stabilizer is configured to transfer a second force between the second arm and the display unit.

15. The head-mounted display of claim 14, wherein the first arm and the second arm are coupled to the display unit with hinges, and the hinges are configured to bias the first arm and the second arm toward the face of the user.

16. The head-mounted display of claim 15, wherein the first lateral stabilizer is connected to the first arm at a location along the first arm that is outward relative to the hinge that couples the first arm to the display unit, and the second lateral stabilizer is connected to the second arm at a location along the second arm that is outward relative to the hinge that couples the second arm to the display unit.

17. The head-mounted display of claim 14, wherein the first arm and the second arm are configured to bend elastically relative to the display unit and are formed from a sprung material configured to bias the first arm and the second arm toward the face of the user.

18. The head-mounted display of claim 14, wherein the facial interface is configured to expand to receive the face of the user.

19. The head-mounted display of claim 18, wherein the facial interface has a resting state, in which the first arm and the second arm are spaced apart by a distance that is less than a width of the face of the user, and a worn state, in which the first arm and the second arm engage the face of the user and are spaced apart by a distance that is generally equal to the width of the face of the user.

20. The head-mounted display of claim 14, wherein the first lateral stabilizer includes a first locking device that is configured to prevent movement of the first arm relative to the display unit, and the second lateral stabilizer includes a second locking device that is configured to prevent movement of the second arm relative to the display unit.

* * * * *

UNITED STATES PATENT AND TRADEMARK OFFICE
CERTIFICATE OF CORRECTION

PATENT NO. : 12,181,919 B2
APPLICATION NO. : 18/214576
DATED : December 31, 2024
INVENTOR(S) : Dustin A. Hatfield, Daniel M. Strongwater and Kristi E. Bauerly Page 1 of 1

It is certified that error appears in the above-identified patent and that said Letters Patent is hereby corrected as shown below:

In the Claims

At Column 18, Claim number 5, Line number 10, "first side is portion" should be --first side portion--.

Signed and Sealed this
Fourth Day of February, 2025

Coke Morgan Stewart
*Acting Director of the United States Patent and Trademark Office*